3,551,172
CERAMIC REFRACTORY
Donald L. Guile, Horseheads, N.Y., assignor to Corhart Refractories Company, Louisville, Ky., a corporation of Delaware
No Drawing. Filed Jan. 18, 1968, Ser. No. 698,709
Int. Cl. C04b *35/12, 35/112*
U.S. Cl. 106—59                                    13 Claims

ABSTRACT OF THE DISCLOSURE

Sintered ceramic refractory bodies derived from raw batch materials of magnesia, chrome ore and titania. A portion of the magnesia particles is very coarse relative to balance of batch. Products display high hot strength and/or excellent thermal shock resistance.

DESCRIPTION OF PRIOR ART

U.S. Pat. 3,194,672, Davies et al., teaches the inclusion of a small amount of titania in brickmaking size graded batches of magnesia and chrome ore, pressing the batch material into desired shapes and firing the thus formed green bodies to obtain basic refractory shapes of enhanced hot strength. The batch contains less than about 5% by weight of $SiO_2$ and the titania is employed in an amount by weight of from 0.5 to about 5 parts per 100 parts of batch. The fired bodies have a hot modulus of rupture at 2300° F. (1260° C.) of about 1000 p.s.i.

McTaggart et al., in U.S. Pat. 3,282,713, provide sintered refractory magnesia-chrome ore bodies containing from 3 to less than 15% of titania. These bodies display a modulus of rupture at 1340° C., a higher temperature of measurement than that employed by Davies et al., of from 1200 to more than 2000 p.s.i. Additionally, they are resistant to the action of molten basic ferruginous slag and display improved thermal shock resistance relative to prior art intered refractory magnesia-chrome ore bodies.

Neither of the above patents provide or suggest the sintered titania-containing magnesia-chrome ore sintered refractory bodies of the present invention which display very high hot strentgh and/or higher resistance to thermal shock.

In recent years, steelmaking processes have been continually improved in efficiency by employing more rapid processing cycles and higher process temperatures, particularly due to oxygen lancing techniques. Obviously, the employment of these higher process temperatures makes it highly desirable to provide, as furnace linings, refractory bodies having much greater hot strength and improved thermal shock resistance than those previously known to the art.

This is particularly important in two areas of the LD basic oxygen steelmaking furnace lining: the area adjacent the trunnions and the so-called charge pad area. It is apparent that the trunnions supporting the furnace and the outer metal furnace wall in an area around the trunnions are subject to extreme mechanical stress. Some warping of the outer metal wall in this area is unavoidable and the stress is transmitted to the contiguous furnace lining. A lining of low hot strength may lose its integrity under deforming forces applied at the temperatures prevailing during the steelmaking process.

The charge pad area is that area of the furnace lining onto which, when the furnace is tilted to receive a charge of raw material, the charge is delivered. This area is subjected, while at elevated temperature, to the impact of the charge being delivered and to the abrasive action of the charge moving over its surface during charging and during the return of the furnace to the upright position. The necessity of the lining in this area exhibiting high hot strength is apparent.

High hot strength is also extremely important in the refractory lining of the Kaldo furnace. Here, as in the LD furnace, a portion of the lining is subjected to the impact of the raw materials being charged. Furthermore, because of the rotation of the furnace, the lining is additionally subjected to extreme abrasive action from the unmelted portion of the charge.

In the operation of both the Kaldo and LD furnaces, the length of a heat is short. Accordingly, the furnace lining is relatively frequently cycled between the extremely high temperature of the steelmaking process and the lower temperature prevailing after discharge and during loading. If the furnace lining exhibits poor thermal shock resistance, it may fail after only a few heats. Obviously, the number of heats that can be carried out before it is required to rebuild the furnace lining is an extremely important economic factor. Accordingly, it is desirable that the lining of a furnace of either type possess the maximum possible resistance to thermal shock.

The refractory products of U.S. Pat. 3,282,713, briefly referred to above, possess excellent resistance to the action of basic oxygen steelmaking slags and are thermally shock resistant. In addition, they display, relative to prior art products, good high temperature strength. Nevertheless, because of the conditions of their use in LD and Kaldo type furnaces, products of significantly enhanced hot strength and greater resistance to thermal shock obviously are greatly to be desired.

A shaped, sintered ceramic refractory body according to U.S. Pat. 3,282,713 is composed of a mixture of materials yielding, in the sintered product, an essential analytical combination of titanium oxide with magnesium oxide and chromium oxide such that the product analytically consists essentially of, by weight, 3 to less than 15% (preferably 5 to 10%) $TiO_2$, 0.8 to 25% $Cr_2O_3$, 40 to less than 95% (preferably 45 to 92%) MgO, the sum of $TiO_2+Cr_2O_3+MgO$ being at least 75% (preferably at least 80%), up to 15% $Fe_2O_3$, less than 7.5% $Al_2O_3$, less than 2% $SiO_2$ and less than 1% CaO.

The above referred to ceramic refractory product is characterized by the essential homogeneity of its macroscopic mineralogy. By mineralogy is meant the combination of chemical composition, phases or crystals and their amount, size, distribution and bonding, and porosity and its amount, size and distribution. On a macroscopic scale all the aforementioned structural features are substantially uniformly alike, i.e. homogeneous, throughout the product. It is this fact that accounts for the resistance to corrosion by slag and molten ferrous metal of the described product.

The homogeneity of structure is apparently due to the fact that the raw batch materials from which the product is formed are intimately blended and finely divided; substantially all (i.e. at least 99% by weight) particles will pass through a 149 micron opening (i.e. −100 mesh U.S. standard fine series). Although the smallest particle size may range down to less than 0.1 micron, the patent states that any substantial amount of extreme fines is to be avoided because otherwise, as is well known, they would cause excessive firing shrinkage as a result of the necessity of using excessive amounts of molding mediums to provide moldability of the raw batch materials. As a general rule, particles less than 1 micron should amount to less than 5% by weight.

Despite the general excellence of the above described refractory products, it is apparent that their practical value would be greatly enhanced if both their hot strength and thermal shock resistance were to be significantly increased thereby increasing their utility as linings for LD and Kaldo steelmaking furnaces. The present invention accomplishes that end.

SUMMARY OF THE INVENTION

This invention relates to a shaped, sintered ceramic refractory body or product exhibiting high hot strength and/or excellent thermal shock resistance. Additionally, this invention relates to such a refractory body, basic in nature, that also possesses good resistance to corrosion and/or erosion by molten materials present in metallurgical processes, such as ferrous metals and basic slags of the type encountered in basic open hearth and basic oxygen vessel steelmaking processes. It further relates to the preparation of the raw materials batches employed in the manufacture of the sintered refractory bodies.

It has been found that, in the preparation of the raw materials batch for the preparation of sintered bodies of analytical composition as defined in U.S. Pat. 3,282,713, the hot strength and/or the thermal shock resistance of the products derived therefrom can be markedly enhanced by a particular departure from the above described particle sizing. More particularly, it has been determined that these marked improvements result if a substantial proportion of the magnesia batch component is significantly coarser than that meeting the above particle size requirement.

More particularly, it has been discovered that if the raw materials batch contains a portion of the magnesia as a much coarser fraction than the balance of the magnesia and the other batch materials, the thermal properties of the sintered refractory bodies made therefrom are markedly improved. Specifically the raw materials batch contains from about 10 to about 30% of the coarser magnesia. This coarser magnesia has an upper size limit of its particle size distribution of from about 10 to about 48 mesh (Tyler standard series), preferably from about 10 to about 28 mesh. Of this coarse fraction, from about 16 to about 40% by weight (preferably from about 32 to about 40%) is retained on a 100 mesh sieve and from about 47 to about 60% (preferably from about 55 to about 60%) is retained on a 200 mesh sieve. All sieve sizes referred to are Tyler standard and the percentages given are on a weight basis.

The balance of the batch, including the remaining magnesia, is of such size that all of it will pass through a 100 mesh sieve and substantially all of it will pass through a 200 mesh sieve.

Sintered refractory bodies derived from raw materials batches as above described in which the coarser magnesia fraction constitutes from about 10 to about 20% of batch weight exhibit a hot modulus of rupture as much as 4 times that of a body of the same composition but derived from a batch in which all the components thereof are equally finely comminuted.

When the coarser magnesia constitutes from about 20 to about 30% of the weight of the raw materials batch sintered refractory bodies derived therefrom are capable of undergoing as many as 20 or more thermal shock cycles without failure. In contrast, analytically equivalent bodies from batches in which all the components are equally finely comminuted generally survive only from about 2 to about 5 such cycles.

It has also been observed that firing shrinkage in the manufacture of the products of the present invention is significantly lower than that encountered in the manufacture of products from batches containing only finely comminuted material.

It is to be emphasized that a −10 mesh magnesia, for example, is not a material substantially all of which has a particle size approximately equal to an opening in a 10 mesh screen. Rather, it is a material all of which passes through a 10 mesh screen, fractions of which are retained by each of all progressively finer screens employed in classifying it, and a portion of which will not be retained by the finest screen ordinarily employed, a 325 mesh screen. Thus, for example, a typical −14 mesh magnesia may have about 60% by weight in the −14 to +200 mesh range and may contain as much as about 15% of −325 mesh material.

The superiority of the products of the present invention in regard to hot strength over products of the same analytical compositions but made from raw materials batches lacking a relatively coarse magnesia component is completely unexpected for several reasons. The analytical compositions of the raw materials batches are the same. Forming operations are the same. Finally, and most importantly, the microscopic mineralogy of the two products are similar. On this basis the products differ principally in grain size. Photomicrographic comparison shows that the average grain size of the products of the present invention is approximately 10 times larger than that of the products derived from uniformly finely comminuted batches. As is generally understood, for sintered ceramic bodies of essentially the same composition, those possessing the finer grain structure would be expected to exhibit a higher modulus of rupture than the coarser grained materials.

Despite the presence in the raw materials batch of the relatively coarse magnesia, the products of the present invention exhibit an essentially homogeneous microscopic mineralogy.

Microscopically, a body or product according to the invention comprises essentially an intimate, intergrown mixture of fine and relatively much coarser periclase crystals and fine mixed, complex magnesium spinel crystals with substantial direct mineralogical bonding of these crystals to those adjacent thereto, and at least a major portion of both the fine and coarse periclase crystals containing therein very fine exsolved (or precipitated) mixed magnesium spinel crystals and discontinuous microcracks. The majority of the periclase crystals are linked as a substantially continuous phase with discontinuous grain boundaries therebetween. Furthermore, in addition to the spinel in the form of fine exsolved crystals in the periclase crystals, spinel appears as a precipitate at portions of the periclase grain boundaries. These grain boundary precipitates have a substantial or greater portion of their faces or surfaces abutting, in contiguous or direct bond, with the faces or surfaces of adjacent periclase or spinel crystals. Because of the low, restricted impurity content of oxides that form low melting phases, there is little of the latter, e.g. silicates or aluminates, mostly in small, scattered or isolated islands that do not hinder the excellent direct bonding of the more refractory crystal phases, as might otherwise be the case if larger amounts of such impurities were incorporated with the resulting formation of low melting films between the more refractory crystals.

The microcracks within the periclase crystals observed are essentially discontinuous because their growth is interrupted by pores, boundaries of exsolved included spinel crystals, etc. They form as the result of the differing rates of shrinking on cooling of the spinel and of periclase. The spinel crystals shrink more slowly than the periclase crystals which contain them as exsolved bodies or into which they protrude at the periclase grain boundaries. This slower rate of shrinkage of the spinel results in considerable tension stresses in the periclase crystals which leads to the development of the microcracks which are believed to be a significant factor in the excellent thermal shock resistance of the bodies of the present invention.

The extent of microcracking is greatest in those bodies made from raw materials batches containing the larger amounts of relatively coarse magnesia.

The mixed complex magnesium-spinel crystals in bodies according to this invention appear to be solid solution of picrochromite ($MgO \cdot Cr_2O_3$) and magnesium orthotitanate. Of course, any iron oxide as $Fe_2O_3$ and any $Al_2O_3$ that are permissible in the batch materials, as hereinafter described, will substitute for or replace some $Cr_2O_3$ and/or $TiO_2$ in the spinel lattice, which may be characterized as magnesio-ferrite ($MgO \cdot Fe_2O_3$) and/or "spinel"

$$(MgO \cdot Al_2O_3)$$

being in solid solution in the principal spinel crystals described above. Moreover, any iron oxide as FeO that is permissible in the batch materials will substitute for or replace some MgO in the lattice of either or both of the periclase and spinel crystals. It will, of course, be understood that these various "spinels" do not appear as separate entities; only a single recognizable complex spinel is evident.

In the preparation of raw materials batches for the production of the products of the present invention, it is, of course, possible to employ substantially pure raw material sources of only $TiO_2$, $Cr_2O_3$ and MgO, but the material costs would be objectionally high for ordinary commercial use. Fortunately, it has been found that certain restricted analytical amounts of $Fe_2O_3$ (and/or FeO), $Al_2O_3$, $SiO_2$ and CaO can be tolerated without any substantial adverse effect on the novel products of this invention and their improved properties. Hence, it is possible to employ common good commercial grades of titania, chrome ore and magnesite. While iron oxide calculated as $Fe_2O_3$ should generally be limited to 15% for volume stability, it is especially important to restrict the contents of $Al_2O_3$, $SiO_2$ and CaO as noted in order to avoid deleterious amounts of lower melting phases or components.

The choice of raw materials will be within the skill of the worker in the art who will recognize that the materials chosen should not introduce into the final batch amounts of $Fe_2O_3$, $Al_2O_3$, $SiO_2$ and CaO in excess of the amounts hereinbefore set out as limiting values for these impurities in U.S. 3,282,713, which limits apply to the raw materials batches of the present invention, as do the general compositional limits thereof. It is, however, preferred to restrict the analytical composition of the products of the invention so that the products consist essentially of, by weight, 5 to 12% $TiO_2$, 0.8 to 25% $Cr_2O_3$, 45 to 92% MgO, the sum of $TiO_2+Cr_2O_3+MgO$ being at least 80%, up to 15% $Fe_2O_3$, less than 7.5% $Al_2O_3$, less than 2% $SiO_2$ and less than 1% CaO.

It will be understood that, in conformity with conventional practice in the refractory ceramic art, all chemical analyses of ceramic batch materials given herein are on an oxide basis.

The comminution of all of the raw batch materials, except the relatively coarse magnesia, to the desired particle size can be conveniently carried out in conventional fluid energy pulverizers wherein partially ground raw material is entrained in a high velocity gas (e.g., air or steam) stream that is directed toward a similar material-bearing, high velocity gas stream flowing in an opposed direction to the first stream, or is directed against a solid surface. In both cases, the raw material particles are crushed to the required sizes as a result of the high velocity impacting on another solid substance. Each raw material is usually finely comminuted separately; however, the fine comminution can be carried out after suitably proportioned batch mixtures are formed when desired.

The relatively coarser magnesia batch component is obtained by crushing a good commercial grade of magnesite in, for example, a roll or other crushing mill and screening the crushed material to remove particles larger than the largest desired size.

Molding of the batch mixture into products or articles of desired shape can be done by any appropriate technique, many of which are well known to those skilled in this art, e.g., slip casting, pressing, extruding, etc. After molding, the shaped mixture is hardened and/or dried as is appropriate for the particular molding technique. Finally, the green shaped pieces are fired at a temperature of at least about 1600° C. (preferably in the range of 1600°–1800° C.) for a time sufficient to develop strongly coherent sintering and bonding of the crystals as described above, and then subsequently cooled to handling or room temperature according to conventional or desired practice.

DESCRIPTION OF THE PREFERRED EMBODIMENTS

In the following non-limiting examples, all parts and percentages are on a weight basis and, as stated above, all chemical analysis of the ceramic batch materials are given on an oxide basis.

EXAMPLE 1

Calcined magnesite (98.45% MgO, 0.66% CaO, 0.16% $SiO_2$, 0.14% $Fe_2O_3$, 0.12% ignition loss) was crushed in a roll mill and screened so as to remove particles larger than −14 mesh. The results of sieve analysis of this material are given in Table I, below.

TABLE I

| Mesh, Tyler standard: | Material retained, percent |
|---|---|
| +14 | 0 |
| +16 | 1.3 |
| +24 | 6.6 |
| +32 | 7.9 |
| +42 | 9.4 |
| +60 | 7.9 |
| +80 | 4.8 |
| +115 | 4.8 |
| +170 | 9.6 |
| +250 | 20.3 |
| +325 | 14.5 |
| −325 | 14.7 |

For the sake of convenience, this material is referred to herein as the crushed magnesia component. Other magnesia employed as a raw batch component is designated comminuted magnesia.

Dry mixtures of crushed magnesia, finely comminuted magnesia, finely comminuted Transvaal low silica chrome ore (46.5% $Cr_2O_3$, 26.2% $FeO+Fe_2O_3$, 13.4% $Al_2O_3$, 11.0% Mgo, 0.9% $SiO_2$, 0.2% CaO) and finely comminuted fritmakers grade titania (99% min. $TiO_2$, 0.01 max. $Fe_2O_3$, 0.20% max. $SO_3$) were prepared. Substantially all of the finely comminuted materials passed through a 200 mesh sieve. Slips were prepared from these various dry mixtures by adding 100 parts thereof to approximately 11 parts of a 7% solution, by weight, of fish oil in toluene. These slips were mixed in rotating containers for about 20 hours and were cast in molds to give green blocks measuring 2 x 4 x 6 in. These were dried at 65° C. and fired for 16 hours at 1750° C. After firing they were cooled at the rate of 10° C. per hour to 1550° C., at which temperature they were held for 24 hours. Thereafter, they were cooled to room temperature at a rate of about 40° C. per hour.

In Table II below the compositions of the batch mixtures are given, together with certain physical properties of the fired products derived therefrom.

TABLE II

| Batch mixture, wt. percent | A | B | C | D | E | F | G | H |
|---|---|---|---|---|---|---|---|---|
| Titania, −200 mesh | 10 | 10 | 10 | 10 | 10 | 10 | 10 | 10 |
| Chrome ore, −325 mesh | 8 | 10 | 12 | 14 | 8 | 10 | 12 | 14 |
| Magnesite, −325 mesh | 57 | 55 | 53 | 51 | 67 | 65 | 63 | 61 |
| Magnesite, −14 mesh | 25 | 25 | 25 | 25 | 15 | 15 | 15 | 15 |
| MOR at 1,340° C., p.s.i. | 3,300 | 3,550 | 4,200 | 4,975 | 4,875 | 6,075 | 7,350 | 8,400 |
| Thermal shock, cycles | 20+ | 20+ | 12+ | 9 | | | | |

NOTE: + Indicates testing discontinued at indicated value.

The thermal shock resistance data was obtained by cutting 1" x 1" x 3" samples from the bricks and subjecting them to a rigorous thermal shock test that consisted of introducing the samples into a furnace heated to 1400° C. and holding the samples in such furnace until they are thoroughly heated to 1400° C. (approximately 10 minutes). Then the samples are withdrawn into the room temperature atmosphere and allowed to cool therein to room temperature. This constitutes one cycle. If a sample has spalled or cracked into two or more pieces, the test is concluded. Otherwise, the cycle is repeated until such spalling or cracking occurs. The total number of cycles completed at the point of this spalling or cracking are noted as shown in the table.

The superiority of the products of the present invention over those of the same analytical composition but derived from raw materials batches containing no relatively coarse magnesia is readily apparent. For example, a body of the latter type (Example 5 in U.S. Pat. 3,282,713) corresponding analytically to products B and F displays a modulus of rupture at 1340° C. of only 1200 p.s.i. and is capable of surviving only about 7 cycles of thermal shock.

In comparing the products of the invention with those made from raw materials batches all of which is comminuted to −100 mesh (U.S. standard fine series) it should be noted that there is no significant difference in the densities of the two types of products.

As is evident from the data in the above table, the invention can provide refractory bodies of excellent thermal shock resistance and relatively high hot strength or bodies of practically adequate thermal shock resistance and extremely high hot strength. Those bodies of higher coarse magnesia content exhibit the better thermal shock resistance, apparently as the result of their higher degree of microcracking.

The lower thermal shock resistance of the bodies of lower coarse magnesia content is not, as a practical matter, of great significance. The thermal shock test described above is an extremely rigorous test inasmuch as the test sample is carried through a temperature range of almost 1400° C., a range not encountered in ordinary use. That is, between heats the lining of a Kaldo or LD furnace will not ordinarily be permitted to undergo a temperature change of this magnitude and the excellent hot strength of the bodies of lower coarse magnesia content is effective to preserve the integrity of the lining constructed therefrom.

I claim:
1. A shaped, sintered refractory body characterized by a modulus of rupture at 1340° C. of at least about 3300 p.s.i. and made from raw material batch including a magnesia component:
   (a) analytically consisting essentially of, by weight, 3 to less than 15% $TiO_2$, 0.8 to 25% $Cr_2O_3$, 40 to less than 95% MgO, the sum of $TiO_2+Cr_2O_3+MgO$ being at least 75%, up to 15% $Fe_2O_3$, less than 7.5% $Al_2O_3$, less than 2% $SiO_2$ and less than 1% CaO;
   (b) substantially all of the batch components except a portion of the magnesia being −100 mesh size;
   (c) the said portion of the magnesia constituting from about 10 to about 30% of the total weight of the batch and consisting of material having an upper size limit of from about 10 to about 48 mesh, from about 16 to about 40% by weight of said portion being retained on a 100 mesh sieve and from about 47 to about 60% by weight being retained on a 200 mesh sieve; and
   (d) said batch being in the form of an intimate mixture of the components thereof.

2. The refractory body of claim 1 consisting essentially of, by weight, 5 to 12% $TiO_2$, 0.8 to 25% $Cr_2O_3$, 45 to 92% MgO, the sum of $TiO_2+Cr_2O_3+MgO$ being at least 80%, up to 15% $Fe_2O_3$, less than 7.5% $Al_2O_3$, less than 2% $SiO_2$ and less than 1% CaO.

3. The refractory body of claim 1 wherein the said portion of the magnesia has an upper size limit of from about 10 to about 28 mesh, from about 32 to about 40% by weight of said portion being retained on a 100 mesh sieve and from about 55 to about 60% by weight being retained on a 200 mesh screen.

4. The refractory body of claim 2 wherein the said portion of the magnesia has an upper size limit of from about 10 to about 28 mesh, from about 32 to about 40% by weight of said portion being retained on a 100 mesh sieve and from about 55 to about 60% by weight being retained on a 200 mesh screen.

5. The refractory body of claim 1 wherein the said portion of the magnesia constitutes from about 10 to about 20% of the total batch weight.

6. The refractory body of claim 1 wherein the said portion of the magnesia constitutes from about 20 to about 30% of the total batch weight.

7. The refractory body of claim 2 wherein the said portion of the magnesia constitutes from about 10 to about 20% of the total batch weight.

8. The refractory body of claim 2 wherein the said portion of the magnesia constitutes from about 20 to about 30% of the total batch weight.

9. The refractory body of claim 3 wherein the said portion of the magnesia constitutes from about 10 to about 20% of the total batch weight.

10. The refractory body of claim 3 wherein the said portion of the magnesia constitutes from about 20 to about 30% of the total batch weight.

11. The refractory body of claim 4 wherein the said portion of the magnesia constitutes from about 10 to about 20% of the total batch weight.

12. The refractory body of claim 4 wherein the said portion of the magnesia constitutes from about 20 to about 30% of the total batch weight.

13. The refractory body of claim 1 in which said body has been fired at a temperature of at least 1600° C.

References Cited

UNITED STATES PATENTS 3,282,713  11/1966  McTaggart et al. _____ 106—59

JAMES E. POER, Primary Examiner

U.S. Cl. X.R.

106—60